United States Patent [19]

Lew

[11] Patent Number: 4,576,360
[45] Date of Patent: Mar. 18, 1986

[54] FLOATING DISC BUTTERFLY VALVES

[76] Inventor: Hyok S. Lew, 7890 Oak St., Arvada, Colo. 80005

[21] Appl. No.: 685,753

[22] Filed: Dec. 24, 1984

Related U.S. Application Data

[63] Continuation-in-part of Ser. No. 413,531, Aug. 31, 1982, Pat. No. 4,520,995.

[51] Int. Cl.$^4$ .............................................. F16K 1/22
[52] U.S. Cl. .................................. 251/162; 251/188; 251/308
[58] Field of Search ................. 251/88, 162, 163, 188, 251/192, 305, 306, 308

[56] References Cited

U.S. PATENT DOCUMENTS

| | | | |
|---|---|---|---|
| 3,477,690 | 11/1969 | Murota et al. | 251/163 |
| 3,601,364 | 8/1971 | Scaramucci | 251/306 |
| 3,627,259 | 12/1971 | Williams | 251/163 |
| 3,697,042 | 10/1972 | Killian | 251/163 |
| 3,854,696 | 12/1974 | Keyes et al. | 251/163 |
| 4,322,056 | 3/1982 | Lew et al. | 251/192 X |

Primary Examiner—A. Michael Chambers
Assistant Examiner—John C. Fox

[57] ABSTRACT

This invention relates to a butterfly valve comprising a floating disc wherein the seating pressure between the valve seat and the rim of the floating disc is relieved prior to the rotation of the disc for opening and closing, and the seating pressure is established after the disc is rotated to the fully closed position. The floating disc butterfly valves taught by this invention comprise a floating disc mechanically connected either to a valve stem supported at both ends or to double cantilever valve stems. A small amount of the axial movement of the valve stem results in either the establishment or relief of the seating pressure between the rim of the floating disc and the valve seat disposed in the valve body.

6 Claims, 12 Drawing Figures

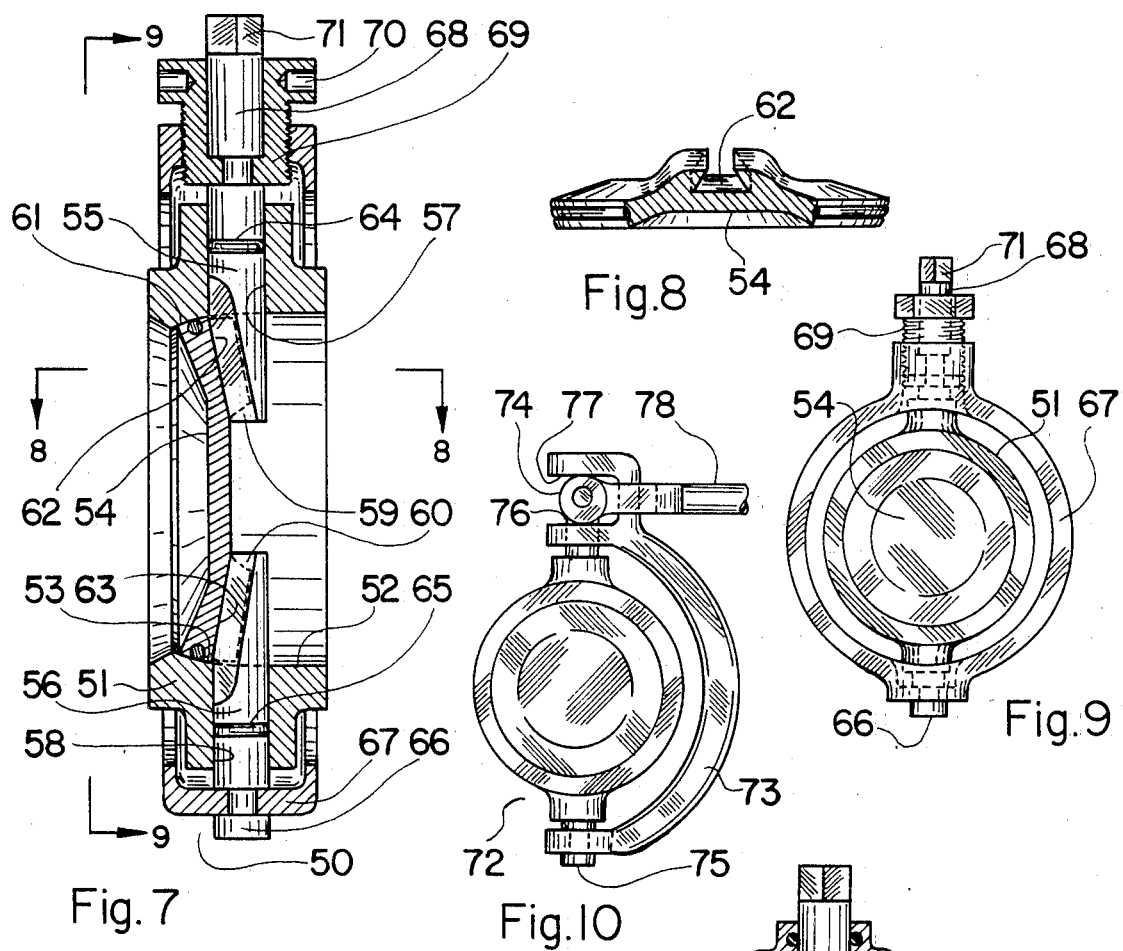

FLOATING DISC BUTTERFLY VALVES

This patent application is a continuation-in-part application to patent application Ser. No. 413,531 entitled "Dished Disc Free Disc Butterfly Valve (as amended) filed on Aug. 31, 1982, U.S. Pat. No. 4,520,995.

BACKGROUND OF THE INVENTION

Butterfly valves are the most widely used among all valves, as they are compact and light weight with good performing characteristics in low to middle pressure ranges. One shortcoming of the conventional butterfly valve is its less than acceptable shut-off performance. With few exceptions, the conventional butterfly valves employ a disc squeezably engaging a valve seat made of a resilient material. Since the rim of the valve disc and the resilient valve seat included in conventional butterfly valves experience a rubbing and scraping action constantly during the opening and closing thereof, they are prone to wear and tear that results in leaks. In applications subjected to high temperatures or highly corrosive environments, the use of resilient materials for the valve seat is often not compatible, and, consequently, conventional butterfly valves have severe limitations as far as their use as specialty valves.

The primary object of the present invention is to provide a floating disc butterfly valve wherein the valve disc is movable over a small distance from or to the valve seat, which movement of the disc is created by a small amount of axial movement of the valve stem.

Another object is to provide a floating disc butterfly valve having a substantially spherical valve seat and a substantially spherical valve disc rim.

A further object is to provide a floating disc butterfly valve with a valve disc mechanically connected to a valve stem supported at both ends.

Yet another object is to provide a floating disc butterfly valve with a valve disc mechanically connected to a pair of cantilever valve stems.

Yet a further object is to provide a butterfly valve that includes a valve seat made of a hard material constituting the valve body.

Still another object is to provide a butterfly valve that includes a valve disc with an annular seal made of a hard or resilient material disposed in the rim of the valve disc.

Still a further object of the present invention is to provide a butterfly valve providing one hundred percent shut-off.

Additionally another object is to provide a butterfly valve wherein the valve seat and the rim of the valve disc are not subjected to mechanical abrasion during opening and closing of the valve.

Additionally a further object is to provide a butterfly valve compatible with extreme working environments such as high temperature, cryogenic and highly corrosive applications.

These and other objects of the present invention will become clear as the description thereof proceeds.

BRIEF DESCRIPTION OF THE FIGURES

The present invention may be described with a greater clarity and specificity by referring to the following figures:

FIG. 7 illustrates a cross section of a floating disc valve including double cantilever valve stems.

FIG. 8 illustrates a cross section of the valve disc employed in the floating disc valve shown in FIG. 7.

FIG. 9 illustrates an end view of the floating disc valve shown in FIG. 7.

FIG. 10 illustrates an end view of another floating disc valve including double cantilever valve stems.

FIG. 11 illustrates a cross section of a further floating disc valve including double cantilever valve stems.

FIG. 12 illustrates a cross section of still another floating disc valve including double cantilever valve stems.

DESCRIPTION OF THE ILLUSTRATED EMBODIMENTS

Figures 1, 2, 3, 4:
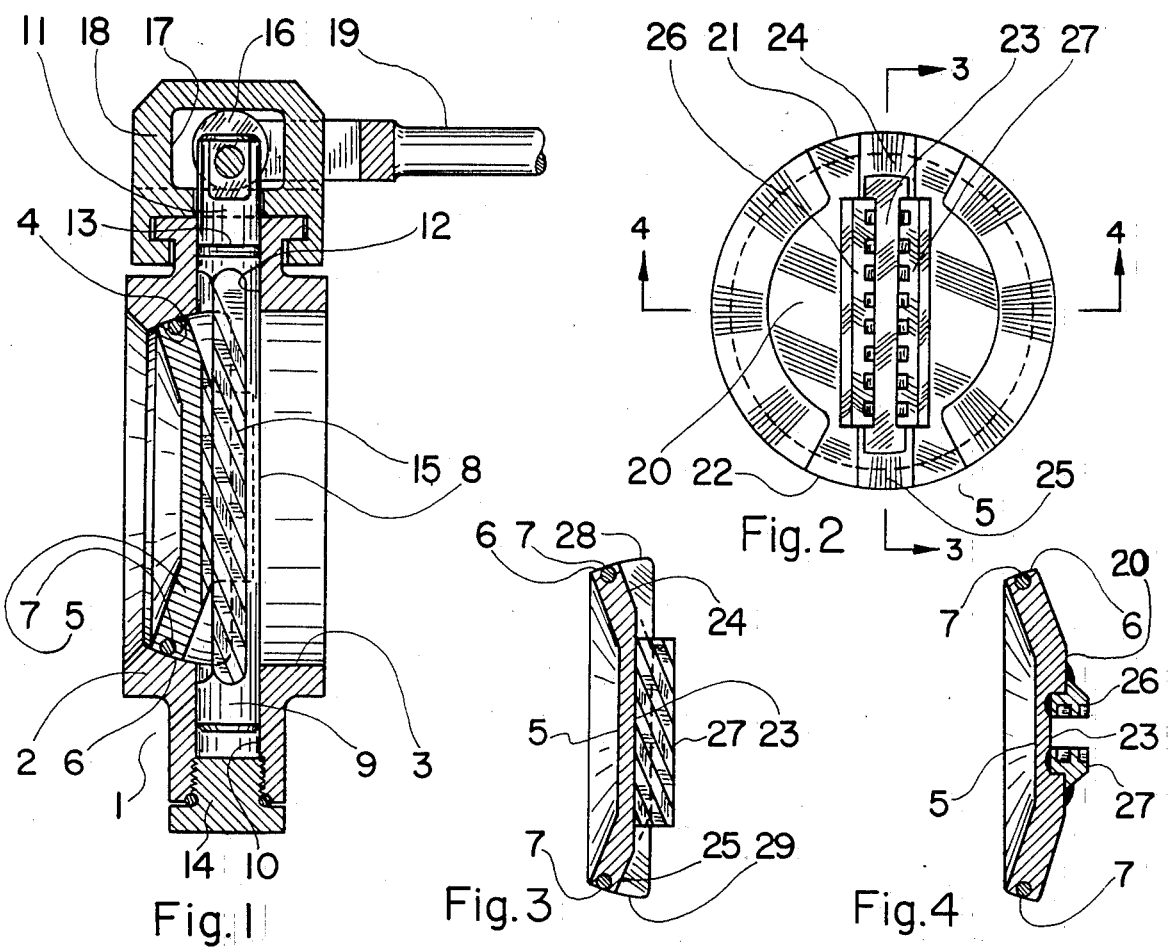
FIG. 1 illustrates a cross section of a floating disc valve including a valve stem supported at both ends.
FIG. 2 illustrates a plan view of the disc employed in the floating disc valve shown in FIG. 1.
FIG. 3 illustrates a cross section of the disc shown in FIG. 2.
FIG. 4 illustrates another cross section of the disc shown in FIG. 2.

In FIG. 1 there is illustrated a cross section of a floating disc valve 1 taken along a plane including the central axis of the fluid passage through the valve. The valve body 2 includes a straight through fluid passage 3 that has a valve seat 4 built in as part thereof, wherein the valve seat 4 substantially coincides with a hypothetical spherical surface with the center located on the central axis of the fluid passage 3 intermediate two extremities thereof. The disc 5 rotatably disposed adjacent to the valve seat 4 has a rim 6 including a resilient annular seal 7 such as an O-ring disposed within a groove formed following the rim 6 of the disc 5. The disc 6 is dished toward the center of the hypothetical spherical surface substantially including the valve seat 4 and the rim 6 of the disc 5. The valve stem 8 with its central axis substantially passing through the center of the aforementioned hypothetical spherical surface is disposed substantially perpendicular to the central axis of the fluid passage 3 and extends across the fluid passage 3 wherein one extremity 9 thereof rotatably and slidably engages a hole 10 disposed through the wall of the valve body 2, while the other extremity 11 rotatably and slidably engages and extends through another hole 12 disposed through the wall of the valve body 2. The annular seal 13 disposed around the valve stem 8 provides a leak-proof engagement of the hole 12 by the stem 8. The cap or plug 14 plugs up the outer opening of the hole 10. The convex side of the disc 5 is mechanically connected to the stem by means of rack joint 15 including a plurality of teeth disposed on planes parallel to the central axis of the stem 8 in a direction oblique to the central axis of the stem 8 and to the plane including the rim 6 of the disc 5. The rack joint 15 will be further described in conjunction with FIGS. 2, 3 and 4. The extremity 11 of the stem 8 emerging outside of the valve body 2 includes an eccentric roller 16 rotatably connected to the outer extremity of the valve stem 8 and rotatably confined with a cutout 17 through a bracket 18 that is rotatably secured to the valve body 2. The eccentric roller is rotatable about an axis perpendicular to the central axis of the stem 8, while the bracket 18 is rotatable about the central axis of the stem 8. A handle 19 rigidly affixed to the eccentric roller 16 and extending therefrom provides means for rotating the eccentric roller 16 and the valve stem 8.

In FIG. 2 there is illustrated a plan view of the valve disc 5 employed in the floating disc valve 1 shown in FIG. 2, wherein the convex side of the dished disc 5 is shown. The central portion 20 of the convex side of the dished disc 5 is substantially flat wherein the flat area is extended to the rim in two diametrically opposite directions and, consequently, a substantially flat ridge extending across the convex side of the dished disc 5 is provided, that extends from one rim side 21 to the other diametrically opposite rim side 22. A groove 23 with the center line passing through the central axis of the disc 5 is disposed in the flat central area 20 wherein two extremities of the groove 23 extend to a pair of wider tapered grooves 24 and 25, respectively. Two side walls of the groove 23 respectively include a pair of racks 26 and 27 welded thereto or formed therein, which include a plurality of rack teeth formed on two parallel planes perpendicular to the plane including the rim of the disc 5 in direction oblique to the plane including the rim of the disc 5. The mid portion of the valve stem 8 includes two sets of rack teeth disposed in an oblique angle with respect to the central axis of the stem, which set of rack teeth are respectively disposed on two opposite sides of the stem 8 shaved to flat surfaces. Of course, the rack teeth included in the valve stem 8 are matched to the rack teeth included in the groove 23 disposed in the central plateau 20 included on the convex side of the disc 5.

In FIG. 3 there is illustrated a cross section of the valve disc 5 shown in FIG. 2, which cross section is taken along a plane 3—3 as shown in FIG. 2. Here, it should be noticed that the rim 6 of the disc 5 has thicker portions 28, 29, etc. adjacent to the extensions 24 and 25 of the groove 23 including a pair of racks 26 and 27.

In FIG. 4 there is illustrated another cross section of the valve disc 5 shown in FIG. 2, which cross section is taken along a plane 4—4 as shwon in FIG. 2. Here, it is clearly illustrated that the pair of racks 26 and 27 including a plurality of slanted rack teeth are welded onto the base material constituting the dished disc 5.

With construction as shown in FIGS. 1, 2, 3 and 4, the floating disc valve 1 operates the following principles: when the handle 19 is pivoted over one hundred eighty degrees about the axis of the eccentric roller 16 from the position shown in FIG. 1, the stem 8 is pulled out over a small distance as the result of the cam action provided by the eccentric roller 16. Such an axial movement of the valve stem 8 of small magnitude in one direction pulls the valve disc 5 away from the valve seat 4 over a small distance in a direction parallel to the central axis of the fluid passage 3, which is the virtue of the rack joint 15 mechanically connecting the valve disc 5 to the valve stem. Consequently, the seating pressure between the valve seat 4 and the rim 6 of the valve disc 5 is partially or totally relieved and the valve disc is freely rotatable without being subjected to the mechanically abrasion between the valve seat 4 and the rim 6 of the valve disc 5, which is executed by rotating the valve stem 8 by turning the handle 19 that is now located at a position opposite to one shown in FIG. 1. After turning the valve disc 4 to the fully closed position as shown in FIG. 1, the seating pressure between the valve seat 4 and the rim 6 of the valve disc 5 is established to a bubble-tight level by flipping the handle 19 over one hundred eighty degrees back to the position as shown in FIG. 1, which action moves the valve stem 8 in the opposite axial direction and, in turn, presses the valve disc 5 onto the valve seat 4. It is not difficult to realize that the valve disc 5 can be locked at a partially or fully open position by flipping over the handle 19 to locking position after rotating the valve disc to a desired position. It can be noticed that, when the bracket 18 is removed from the valve body, the stem 8 can be pulled completely out of the valve body 2 after rotating the valve disc 5 over one hundred eighty degrees from the position shown in FIG. 1. This feature of the combination including the disc 5 and the stem 8 enables easy assembly and disassembly that is crucial in the manufacturing and maintenance of the valve. It is generally recommended to install a stop in the valve assembly that limits the rotation of the valve disc 5 to ninety degrees from the position shown in FIG. 1. It does not require any further explanation that the floating disc valve 1 is an advanced technology valve that provides a bubble-tight shut-off every time because the seating pressure between the valve seat and the rim of the valve disc can be increased to any value required to provide a bubble-tight shut-off without worrying about how to open it and close it. The floating disc valve 1 also provides a long trouble-free life because the wear and tear experienced by valve seat and the rim of the disc included in the conventional butterfly valves is completely eliminated by the virtue of the floating disc wherein the seating pressure between the valve seat and the rim of the disc is completely relieved before rotating the disc to open or close. It should be understood that the floating disc valve 1 shown in FIG. 1 is capable of taking a surge pressure of the fluid medium much better than any conventional butterfly valves because of the spherical valve seat acting as a rigid shoulder supporting the valve disc against the pressure loading thereon.

Figure 5:
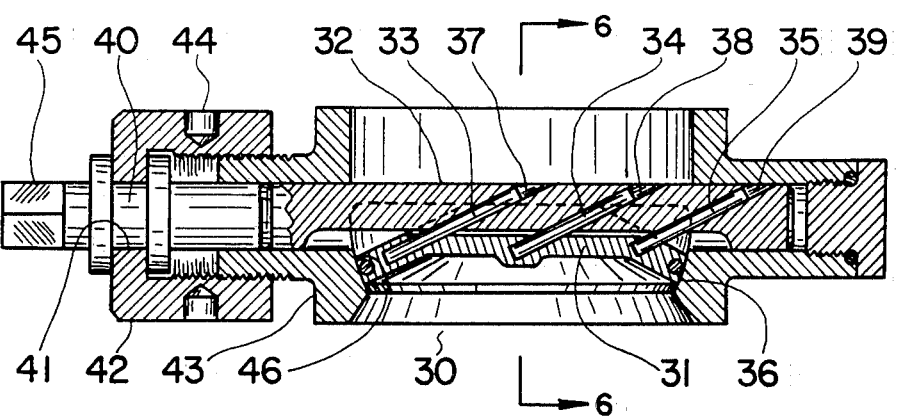
FIG. 5 illustrates cross section of another floating disc valve including a valve stem supported at both ends.

In FIG. 5 there is illustrated a cross section of another floating disc valve 30 having a construction very similar to the floating disc valve 1 shown in FIG. 1 with a couple of exceptions. The first exception involves the mechanical connection between the dished disc 31 and the stem 32. The disc 31 includes a plurality of pins 33, 34, 35, etc. rigidly affixed to the convex side of the dished disc 31 in a straight line passing through the central axis of the disc 31 and extending therefrom in an oblique angle with respect to the plane including the rim 36 of the disc 31. The mid portion of the valve stem 32 includes a plurality of holes 37, 38, 39, etc. disposed through the valve stem 32 on a plane including the central axis of the stem 32 in a direction oblique to the central axis of the stem 32. The plurality of pins 33, 34, 35, etc., which extend from the convex side of the disc 31 in an oblique angle, slidably engaging the plurality of the holes 37, 38, 39, etc. disposed through the mid portion of the stem 31 in an oblique angle provides the same result and effect as the rack joint 15 employed in the floating disc valve 1 shown in FIG. 1. The second exception involves the mechanism for moving the valve stem 31 in two opposite axial directions over a small distance. The outer extremity 40 of the stem 32 rotatably and nonslidably engages and extends through a hole 41 centrally disposed through a jack screw 42 that is threadedly connected to the valve body 43. The jack screw 42 includes means 44 for rotating thereof which may be wrench sockets, a handle wheel, or a handle lever. The outer end of the stem 32 includes means 45 for rotating thereof, which may be a wrench flat, a handle wheel or handle bar, or other actuator. The rotation of the jack screw 42 in one direction moves the valve stem 32 in one axial direction over a small distance that pulls the disc 31 away from the valve beat 46 and, consequently, relieves the seating pressure between the valve seat and the rim of the valve disc for a easy abrasionless rotation of the valve disc. The rotation of the jack screw 42 in the opposite direction moves the valve stem 32 in the other opposite axial direction over a small distance that pushes the disc 31 onto the valve seat 46 and, consequently, establishes the seating pressure between the valve seat and the rim of the valve disc for a bubble-tight shut-off. Of course, it is clear that the jack screw means for creating axial movements of the valve stem as shown in FIG. 5 can be employed in the place of the eccentric roller means shown in FIG. 1 and vice versa. There are many other means providing a mechanical advantage in creating the axial movements of the valve stem which can be employed in place of the illustrated means shown in FIGS. 1 and 5, which are not included in the illustrative embodiments, as those means belong to the matter of design.

Figure 6:
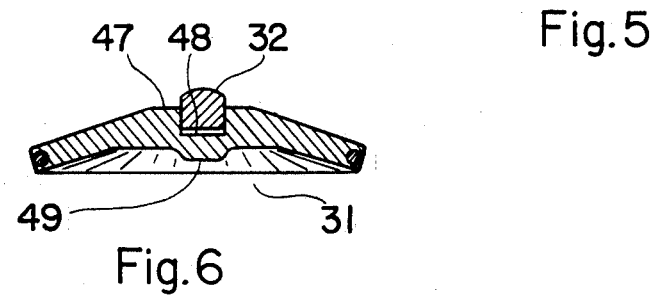
FIG. 6 illustrates a cross section of the combination of the disc and stem employed in the floating disc valve shown in FIG. 5.

In FIG. 6 there is shown a cross section of the floating disc valve 30 shown in FIG. 5, which cross section is taken along a plane 6—6 as shown in FIG. 5. The central plateau 47 of the convex side of the disc 31 includes a groove 48 nonrotatably and slidably engaged by the mid portion of the stem 32 shaved on sides to provide a cross section matched to the cross section of the groove 48. As a consequence, the sliding pin joint between the disc 31 and the stem 32 does not bear the full amount of the torque transmitted from the stem 32 to the disc 31, as the majority thereof is transmitted through the non-rotatable joint between the valve stem 32 and the groove 47 included on the convex side of the disc 31. The boss 49 is included to provide a sufficient strength in supporting the pin 34 as shown in FIG. 5.

In FIG. 7 there is illustrated a cross section of a floating disc valve including double cantilever stems, which cross section is taken along a plane including the central axis of the fluid passage through the valves. The floating disc valve 50 includes the valve body 51 having a fluid passage 52 that comprises a spherical seat 53, which combination is constructed essentially in the same manner as the element 2 is shown in FIG. 1. The dished disc 54 having essentially the same construction as the element 5 shown in FIG. 1 is mechanically connected to a pair of cantilever stems 55 and 56 rotatably and slidably engaging two holes 57 and 58, respectively, which are disposed through the wall of the valve body 51 at two diametrically opposite positions. The holes 57 and 58 have a common central axis that substantially passes through the center of the hypothetical spherical surface substantially including the spherical seat 53. The inner extremities of the cantilever valve stems 55 and 56 respectively include the retaining slide rails 59 and 60 such as dove-tail rails with center planes substantially including the common central axis of the cantilever vlave stems 55 and 56, which are disposed in two opposite oblique angles with respect to the plane including the rim 61 of the disc 54. The convex side of the disc 54 includes a pair of retaining slide grooves 62 and 63 such as dove-tail grooves with a common center substantially including the central axis of the dished disc 54, which are disposed in two opposite oblique angles with respect to the plane including the rim 61 of the disc 54. The retaining slide grooves 62 and 63 are respectively engaged by the retaining slide rails 59 and 60 respectively included in the inner extremities of the cantilever valve stems 55 and 56 in a nonrotatable sliding relationship. The cantilever valve stems 55 and 56 respectively extend through the holes 57 and 58 in a leak-proof fashion as facilitated by a pair of resilient annular seals 64 and 65 disposed on the cantilever stems 55 and 56, respectively. The outer extremity 66 of the cantilever stem 56 is rotatably and nonslidably connected to an annular frame 67 disposed around the valve body 51, while the outer extremity 68 of the cantilever stem 55 is rotatably and nonslidably connected to a jack screw 69, which is threadedly connected to the annular frame 67 at a position diametrically opposite to the position where the valve stem 56 is connected to. The jack screw 69 includes means 70 for rotating thereof. The outer end of the valve stem 55 includes means 71 for rotating thereof. The valve stems 55 and 56 may be called "cantilever stems" or "stub stems" in the description of the invention and claims thereon hereinafter.

In FIG. 9 there is illustrated an end view of the floating disc valve 50 shown in FIG. 7 viewed through a plane 9—9 as shown in FIG. 8. It is shown here that the annular frame 67 is supported solely by the pair of stub stems 55 and 56 and, consequently, it is not directly secured to the valve body 51. The rotation of the jack screw 69 in one direction creates axial movements of the stub stems 55 and 56 away from one another over a small distance and, in turn, pulls the disc 54 away from the seat 53 over a small distance, which relieves the seating pressure between the valve seat 53 and the rim 61 of the disc 54 for easy rotation of the valve disc. The rotation of the jack screw 69 in the opposite direction creates axial movements of the stub stems 55 and 56 towards one another over a small distance and, in turn, pushes the disc 54 onto the seat 53, that establishes seating pressure between the valve seat 53 and rim 61 of the disc 54 for a bubble-tight shut-off.

In FIG. 10 there is illustrated an end view of another floating disc valve 72 having essentially the same construction as the floating disc valve 50 shown in FIG. 7 with the following exceptions: The C-frame 73 replaces the annular frame 67 shown in FIG. 9 and the eccentric roller 74 replaces the jack screw 69 shown in FIG. 9. The outer extremity 75 of one stub stem is rotatably and nonslidably connected to one extremity of the C-frame, while the outer extremity 76 of the other stub stem is connected to the other extremity of the C-frame by means of an eccentric roller 74 confined within a slot 77 included in the other extremity of the C-frame 73. The eccentric roller 74 is pivotably connected to the outer extremity 74 of the other stub stem wherein the handle 78 extending from the eccentric roller 74 is used to operate the cam mechanism that creates the axial movements of the stub stems included in the floating disc valve 72.

FIG. 11 there is illustrated a cross section of a further floating disc valve 79 that has essentially the same construction as the floating disc valve 50 shown in FIG. 7 with the following exceptions: One stub stem 80 does not extend through the wall of the valve body as the hole 81 rotatably and slidably engaged by the stub stem 80 is plugged up by the plug 82 in a leak-proof manner. The other stub stem 83 has a hole 84 axially disposed therethrough, that is rotatably and nonslidably engaged by a rod 85 in a leak-proof manner as facilitated by a resilient annular seal 86. The inner extremity 87 of the rod 85 is threaded and threadedly engages a threaded hole 88 disposed axially through the stub stem 80. The outer extremity of the rod 85 includes means 89 for rotating thereof. The rotation of the rod 85 in one direction relieves the seating pressure between the valve seat and the rim of the valve disc, and the rotation of the rod 85 in the opposite direction establishes the seating pressure.

In FIG. 12 there is illustrated a cross section of yet another floating disc valve 90 having essentially the same construction as the floating disc valve 50 shown in FIG. 7 with one exception being that the outer extremities of the stub stems 91 and 92 are respectively connected to a pair of hydraulic or pneumatic cylinders 93 and 94, which create the relative axial movements of the stub stems hydraulically or pneumatically for relieving and establishing the seating pressure between the valve seat and the rim of the valve disc. Of course, opening and closing of the valve is accomplished by rotating the stub stem 91 by means of a handle or an actuator connected thereto.

While the principles of the present invention have now been made clear by the illustrative embodiments, it will be immediately obvious to those skilled in the art many modifications in the arrangements, elements, proportion, structures and materials which are particularly adapted to the specific working environment and operating conditions in the practice of the invention without departing from those principles.

I claim:

1. A floating disc valve comprising in combination:
   (a) a valve body including a fluid passage having an inner surface including an annular seat disposed on a plane substantially perpendicular to the central axis of said fluid passage wherein said annular seat substantially coincides with a hypothetical spherical surface with the center substantially located on the central axis of said fluid passage;
   (b) a stem with the central axis substantially passing through the center of said hypothetical spherical surface and intersecting the central axis of said fluid passage in a substantially perpendicular angle, said stem including two sets of rack teeth respectively disposed on two opposite sides of said stem intermediate two extremities of said stem wherein said rack teeth are disposed in an oblique angle with respect to the central axis of said stem, said stem rotatably and slidably supported at two extremities by said valve body wherein at least one extremity of said stem extends through said valve body rotatably and slidably in a leak-proof manner; and
   (c) a disc pivotably disposed within said fluid passage adjacent to said annular seat having a rim substantially conforming to said annular seat when said disc is rotated to the fully closed position, said disc slidably connected to said stem by means of said two sets of rack teeth included in said stem slidably engaging two sets of rack teeth disposed on one side of said disc wherein said disc rack teeth are disposed in an oblique angle with respect to the plane including the rim of said disc, wherein the only possible movement of said disc relative to said stem is a sliding movement on a plane substantially including the central axis of said disc and the central axis of said stem;

whereby, a small amount of axial movement of said stem in one direction relieves the seating pressure between said annular seat and the rim of said disc and a small amount of axial movement of said stem in the other direction opposite to said one direction establishes said seating pressure.

2. The combination as set forth in claim 1 wherein said combination includes means for rotating said stem about the central axis of said stem and means for moving said stem over a small distance in axial directions.

3. The combination as set forth in claim 2 wherein said disc is dished toward the center of said hypothetical spherical surface.

4. The combination as set forth in claim 1 wherein a resilient annular seal is disposed around the rim of said disc.

5. The combination as set forth in claim 4 wherein said combination includes means for rotating said stem about the central axis of said stem and means for moving said stem over a small distance in axial directions.

6. The combination as set forth in claim 5 wherein said disc is dished toward the center of said hypothetical spherical surface.

* * * * *